United States Patent [19]

Trampel

[11] Patent Number: 4,928,629

[45] Date of Patent: May 29, 1990

[54] EGG INOCULATION METHOD

[75] Inventor: Darrell W. Trampel, Ames, Iowa

[73] Assignee: Iowa State University Research Foundation, Inc., Ames, Iowa

[21] Appl. No.: 205,861

[22] Filed: Jun. 13, 1988

[51] Int. Cl.$^5$ .............................................. A01K 29/00
[52] U.S. Cl. ....................................................... 119/1
[58] Field of Search ............................ 426/300; 119/1

[56] References Cited

U.S. PATENT DOCUMENTS

| | | | |
|---|---|---|---|
| 2,655,449 | 10/1953 | Almquist | 426/300 X |
| 3,148,649 | 9/1964 | Moore et al. | 119/1 |
| 3,377,989 | 4/1968 | Sandhage et al. | 119/1 |
| 3,758,256 | 9/1973 | Terada | 426/300 X |
| 4,040,388 | 8/1977 | Miller | 119/1 |
| 4,469,047 | 9/1984 | Miller | 119/1 |

Primary Examiner—Robert P. Swiatek
Attorney, Agent, or Firm—Zarley, McKee, Thomte, Voorhees & Sease

[57] ABSTRACT

A method is disclosed for inoculating eggs without damaging the shell of the egg, where the outer cuticle of at least a portion of the egg is removed, and the inoculant fluid introduced to the pores of the egg at a pressure satisfactory to penetrate through the pores to the interior of the egg, while not damaging the shell.

14 Claims, No Drawings

EGG INOCULATION METHOD

BACKGROUND OF THE INVENTION

This invention relates to a method to immunize domestic poultry against infectious diseases. Specifically, it relates to the inoculation of an egg with vaccines, vitamins, or other soluble materials, prior to the chicken being exposed to diseases, and to improve development at the earliest possible time.

Young chicks and poults are exposed to disease-causing agents on the first day after hatching when they enter the brooder house. Vaccination during the incubation period would allow the birds to develop partial or total immunity to infectious microorganisms prior to exposure. Birds could develop immunity at an earlier age and suffer fewer death losses in the brooder house. Currently, birds are usually vaccinated after hatching by water or aerosolization. Most of the immunizing products are first applied to birds that are several days of age and then repeated periodically. In recent years, vaccines against respiratory viruses have been aerosolized and used in older birds. Eye drop vaccination is employed to protect birds one week of age or older against infectious laryngotracheitis. The problems that exist with these methods are that such vaccination does not ensure that each bird is exposed, nor do they allow the poultry producer to control the exact dose that each bird receives.

Further, the earlier the vaccination, the less likelihood that there will be loss of poultry to infectious diseases. A major problem associated with the current poultry vaccination procedures is that baby birds are exposed to field viruses and bacteria before they have the opportunity to develop immunity. Almost without exception, a full week is required to develop a protective level of antibodies after a bird has been vaccinated. Even if birds are immunized on the first day after hatching, they are still susceptible to an infectious disease during the first seven days of life. Birds surviving an infection at such an early age frequently have impaired productivity for the remainder of their life. If chickens possessed immunity when they emerged from the egg, they would be much more resistant to disease at an early age.

Attempts have been made to immunize chick embryos, but the major difficulty involves transporting the vaccine material through the egg shell. One method which has been attempted to deliver material such as antibiotics and vaccines through the egg shell is to place warm, incubating eggs in a cold antibiotic solution. The material in the egg contracts upon contact with the cold solution, thus creating a vacuum inside the egg which causes the antibiotic fluid to pass through the pores of the egg shell to the embryo. The problem with this method is that, when done on a large scale, th antibiotic fluid becomes contaminated by microbes that are not susceptible to the antibiotic. When these microbes are pathogenic, they can infect and kill the embryos.

Another method to get the material to the embryo is to pass a needle through the shell to the embryo and inject the substance. Unfortunately, the trauma of the needle injection often kills the embryo. also, there is a relatively large hole in the shell after the needle is withdrawn. Microbes from the environment can easily enter such a large opening in the shell.

This invention improves upon the prior art by providing for a method of inoculation which forces the soluble material through the pores in the shell, without damage to the shell or the chick embryo.

SUMMARY OF THE INVENTION

This invention relates to inoculation of an egg by removal of the cuticle of the egg, in order to expose the pores, and exposing the shell with removed cuticle to the soluble material at a pressure adequate to penetrate through the pores of the shell to the interior of the egg, without causing damage to the shell.

Accordingly, it is an object of this invention to provide for inoculation of poultry at the earliest possible stage of growth.

It is another object of this invention to provide for inoculation of an egg which does not cause trauma to the shell, or to the embryo.

Another object of the invention is to provide a method of penetrating the shell of an egg with vaccines, vitamins, or other soluble materials.

Yet another object of the invention is to provide a method of inoculation which assures that a specific amount of the soluble material is provided to each bird.

Still another object of the invention is to use air pressure to force the soluble material through the pores of the egg shell.

DETAILED DESCRIPTION OF THE INVENTION

In order to provide the exchange of water, oxygen and carbon dioxide between the chick embryo and the environment, the egg is provided with pores in the egg shell. There are approximately 7,000 to 17,000 of these pores per egg. The pores are funnel-shaped, with the wide end at the outer shell surface, and form connecting passages between the outer shell surface and the interior of the egg. The largest number of these pores are at the blunt end of the egg.

Much of the egg surface is covered by a water-insoluble proteinaceous cuticle. The cuticle is composed of protein and polysaccharides. When the cuticle is removed, fluid can then pass through the pores. Various solvents and abrasive materials can be used to remove the cuticle from the site of inoculation. One type of solvent to remove the cuticle is Quarternary Ammonium Disinfectant marketed under "Dual Chain" by I. D. Russell Co. of Kansas City, Mo. Its active ingredients include 8% alkyl dimethyl benzyl ammonium chloride, 6% octyl decyl dimethyl ammonium chloride, 3% didecyl dimethyl ammonium chloride, and 3% dioctyl dimethyl ammonium chloride. Exposure of the egg to this solvent from 7 to 10 seconds sufficiently removes the cuticle. Another method of removing the cuticle is through abrasive means, such as fine sandpaper. Of course, any method of removing the cuticle without harming the shell would be effective.

Once the cuticle is removed, the fluid to be inoculated may then be forced through the pores at a pressure sufficient to allow penetration into the egg through the pores, but without causing damage to the shell of the egg itself. The pressure which may be used would range from two pounds per square inch to five pounds per square inch, with the preferable being about five pounds per square inch.

Time for exposure of the egg to such pressure will vary depending on the amount of pressure appllied. At 1 ppsi, about five minutes would be necessary to provide appropriate penetration into the egg, while at the preferred 5 ppsi, the time would be about one minute.

Amount of inoculent is not critical and would vary with the type used and would be prepared according to directions accompanying such vaccines or vitamin supplements. As mentioned, a variety of inoculents could be employed including vaccines, vitamins, or any other soluble material benefical to the chick embryo.

The example below is set forth to illustrate the invention.

EXAMPLE

The cuticle of a fertilized egg would be removed to expose the pores by placing one end in Quarternary Ammonium Disinfectant, sold by I. D. Russell Co. in Kansas City, Mo, for ten seconds. The egg would be placed in a device to support the egg and prevent it from moving while the procedure is underway with the portion having the cuticle removed exposed to the inoculant. A device to be used would be that described in co-pending application, "Egg Inoculation Device" by Gassman, Larson, Trampel and Hasbrook, filed concurrently with this application filed June 13, 1988 and assigned Ser. No. 205,950. After placement in the device, one cubic centimeter of infectious laryngotracheitis vaccine is placed within the dispensing apparatus. The device is activated and a pump would force the inoculent through the exposed pores into the egg. The pressure applied would be about 5 ppsi for one minute. After such an exposure, 3/10 cc of the inoculent would be expected to pass into the egg.

Thus, it can be seen that the invention accomplishes at least all of its stated objectives.

What is claimed is:

1. A method of inoculating soluble materials into an egg having a large end and a small end, a shell with pores, and a cuticle surrounding said shell, comprising:
   removing at least a portion of said cuticle from said egg;
   forcing soluble materials with a pump to said egg having said cuticle removed at a positive pore-penetrating pressure above ambient atmospheric pressure which allows said shell to remain intact so that said soluble materials pass through said pores into said egg.

2. The method of claim 1 further comprising providing a support means to hold said egg in a fixed position during inoculation.

3. The method of claim 1 wherein said cuticle of said egg is removed by exposing at least a portion of said egg to a corrosive material which removes said cuticle without damaging said shell.

4. The method of claim 3 wherein said corrosive material is Quarternary Ammonium disinfectant.

5. The method of claim 1 wherein said cuticle of said egg is removed by contacting said egg with an abrasive substance until said cuticle is removed.

6. The method of claim 5 wherein said abrasive substance is sandpaper.

7. The method of claim 1 wherein said cuticle is removed from said large end of said egg.

8. The method of claim 1 wherein said soluble materials are forced to said portion of said egg having said cuticle removed at a pressure of approximately two pounds per square inch to five pounds per square inch.

9. The method of claim 8 wherein said pressure is approximately five pounds per square inch.

10. The method of claim 9 wherein said soluble materials are forced to said portion of said egg having said cuticle removed for five minutes.

11. The method of claim 8 wherein said soluble materials are forced to said portion of said egg having said cuticle removed for approximately one to five minutes.

12. The method of claim 1 wherein said soluble materials comprise a poultry vaccine.

13. The method of claim 1 wherein said soluble materials comprise a poultry vitamin supplement.

14. A method of inoculating soluble materials in an egg having a shell with pores and a cuticle surrounding said shell, comprising:
   removing at least a portion of said cuticle from said egg;
   forcing soluble materials with a pump to said portion of said egg having said cuticle removed at a positive pressure of 1 ppsi to 5 ppsi above ambient atmospheric pressure for one to five minutes;
wherein said soluble materials pass through said pores into said egg while allowing said shell to remain intact.

* * * * *